3,554,997
PROCESS FOR PREVENTING GEL FORMATION DURING POLYMERIZATION IN TUBE REACTOR
Stanley I. Bates, Midland, and Gerald R. Girard, Bay City, Mich., assignors to The Dow Chemical Company, Midland, Mich., a corporation of Delaware
No Drawing. Filed Oct. 2, 1968, Ser. No. 764,640
Int. Cl. C08d 3/08, 3/12; C08f 3/18
U.S. Cl. 260—94.2        8 Claims

ABSTRACT OF THE DISCLOSURE

Substantially gel-free polymers and copolymers of conjugated diolefins such as 1,3-butadiene are prepared in a continuous process by employing a sufficient amount of a 1,2-diolefin gel inhibitor such as propadiene to substantially prevent the formation of gel during polymerization. The process involves contacting the conjugated diolefin monomers alone or with additional polymerizable monomers such as styrene with an organolithium catalyst such as butyllithium in a suitable hydrocarbon diluent under polymerization conditions of suitable temperature and pressure to produce the polymer. The polymers produced by the process of this invention are suitable for fabrication, for example, into a variety of useful rubber articles of manufacture.

---

This invention relates to the art of polymerization. In one aspect, this invention relates to processes for polymerizing conjugated diolefins alone or with other polymerizable monomers to produce polymers containing a major amount of combined conjugated diolefins. In another aspect, this invention relates to the elimination of gel during the production of a polymer having at least a major proportion of combined conjugated diolefin.

A problem of major concern associated with continuous processes for polymerizing conjugated diolefins in the presence of an organolithium catalyst involves the formation of gel during polymerization. While the presence of gel is undesirable from the standpoint of having a deleterious effect on the polymer produced, when the polymerization is effected in a pipe or tube reactor the problem of gel formation is even more serious because the reactor will become impacted with gel and polymer. This condition necessitates cleaning the reactor and in the more severe cases it may be necessary to disassemble parts of the reactor and associated conduits to remove the gel before polymerization can be resumed.

Although the art recognizes this problem in the polymerization of conjugated diolefins, attempts to solve the problem such as by the introduction of gel formation inhibitors frequently causes more problems in that the inhibitors sometimes interfere with the polymerization reaction and/or they sometimes affect the properties of the resulting polymer. For example, the use of an alkyl halide such as butyl bromide is known in the art for the purpose of inhibiting gel formation. While the available evidence appears to substantiate the claim that an alkyl halide does indeed tend to eliminate gel formation, in some cases the alkyl halide is believed to undesirably affect the properties of the polymer such as by causing discoloration and the like.

According to this invention, gel formation is substantially prevented during polymerization of conjugated diolefin monomers in the presence of an organolithium catalyst by conducting the polymerization in the presence of a gel inhibitor selected from the group consisting of 1,2-diolefins having up to about 10 carbon atoms per molecule.

Accordingly, it is an object of this invention to prevent gel formation during polymerization of conjugated diolefins.

Another object of this invention is to provide an improved process for polymerizing conjugated diolefins in a continuous manner.

Still another object of this invention is to provide a process for continuously producing polymers having at least a major proportion of combined conjugated diolefin in the presence of an organolithium catalyst without the formation of gel during the polymerization reaction.

These and other objects of the invention will become apparent to one skilled in the art after studying the following detailed description and the appended claims.

In the practice of this invention, a suitable hydrocarbon diluent having the desired concentration of organolithium catalyst is passed through an inlet line to a reactor maintained at polymerization conditions of temperature and pressure. The conjugated diolefin monomers which are to be polymerized are introduced into the inlet line along with the desired amount of 1,2-diolefin gel inhibitor such that the monomers and inhibitor are fed to the reactor along with the hydrocarbon diluent. The reactor is maintained at any suitable temperature such as, for example, between about −20° and about 200° C. The pressure in the reactor will depend upon such factors as the monomers being polymerized, the diluent employed, and the temperature at which polymerization is effected. While the reactor can be operated at autogenous pressures, it is generally preferred to employ pressures sufficiently high to maintain the monomers substantially in the liquid phase. The feed rates of the hydrocarbon diluent and the monomers which are to be polymerized can vary over wide limits and will depend upon the relative concentration of the catalyst, the concentration of the gel inhibitor, the rate of withdrawal of the polymer product, and the like.

In a modification of the invention, the gel inhibitor effectively serves to prevent the formation of gel during the copolymerization of a conjugated diolefin with other polymerizable monomers. In this embodiment of the invention, the conjugated diolefin monomers and the additional polymerizable monomers are introduced into the inlet line along with the gel inhibitor. Since it has been discovered that the polymerization of the conjugated diolefin monomers results in the formation of gel, a gel inhibitor is most effective when there is a sufficient amount of the conjugated diolefin monomers being polymerized to cause the problem of gel formation. In general, the problem of gel formation occurs especially when the polymer produced contains at least a major proportion of combined conjugated diolefin.

Conjugated diolefins which can be polymerized separately or with additional polymerizable monomers in the practice of this invention include those conjugated diolefin monomers having from 4 to 10 carbon atoms per molecule. Exemplary conjugated diolefins include 1,3-butadiene, 2-methyl-1,3-butadiene (isoprene), 1,3-pentadiene (piperylene), and the like. Other polymerizable monomers which can be copolymerized with the conjugated diolefins in accordance with this invention include styrene, t-butylstyrene, α-methylstyrene, 3-methylstyrene, 1-vinylnaphthalene; vinylpyridines such as 2-vinylpyridine, 3-vinylpyridine, 4-vinylpyridine; vinyl halides and vinylidine halides such as vinyl bromide, vinyl chloride, vinylidine chloride and the like; and esters of acrylic acid such as ethyl acrylate, ethyl methacrylate, n-butyl acrylate, phenyl methacrylate, and the like.

The polymerization of the conjugated diolefins is effected by contacting the monomers with a catalyst or initiator comprising an organolithium compound having the formula $R(Li)_n$ wherein R is a hydrocarbon radical selected from the group consisting of aliphatic, cycloaliphatic, and aromatic radicals and $n$ is an integer from 1 to 4, inclusive. The hydrocarbon radical of the organolithium catalyst has a valence equal to the integer and preferably contains from 1 to about 20 or more carbon atoms. Exemplary organolithium compounds within the above formula include methyllithium, propyllithium, isopropyllithium, n-butyllithium, tert-octyllithium, n-decyllithium, phenyllithium, naphthyllithium, 4-pentylphenyllithium, p-tolyllithium, cyclohexyllithium, 4-cyclohexylbutyllithium, dilithiomethane, 1,4-dilithiobutane, 1,20-dilithioeicosane, 1,4-dilithiobutene-2, 1,4-dilithiobenzene, 1,5-dilithionaphthalene, 1,2 - dilithio-1,8-diphenyloctane, 1,5,15-trilithioeicosane, 1,2,5-trilithionaphthalene, 1,3,5,8-tetralithiodecane, 1,2,4,6 - tetralithiocyclohexane, 1,2,3,5-tetralithio-4-hexylanthracene, and the like.

Suitable hydrocarbon diluents which can be employed in the practice of this invention include aromatic hydrocarbons, paraffins, and cycloparaffins. In general, the hydrocarbon diluents have between about 3 and about 12 carbon atoms per molecule, inclusive. Exemplary diluents which can be employed include propane, isobutane, n-pentane, isooctane, n-dodecane, cyclopentane, cyclohexane, methylcyclohexane, benzene, ethylbenzene, toluene, xylene, naphthalene, and the like. Mixtures of two or more of the foregoing hydrocarbon diluents can also be used if desired.

As previously indicated, the formation of gel during polymerization is substantially prevented by employing a sufficient amount of a gel inhibitor selected from the group consisting of 1,2-diolefins having up to about 10 carbon atoms per molecule. Exemplary straight or branched chain 1,2-diolefins which can be employed to substantially prevent the formation of gel include propadiene (allene), 1,2-butadiene, 1,2-pentadiene, 1,2-octadiene, 1,2-decadiene, 5-methyl-1,2-heptadiene, 5,6-dimethyl-1,2-octadiene, and the like.

While it is to be understood that the invention is not to be bound by or predicated upon any particular theory, it is believed that the gel inhibitor functions to prevent the formation of ultra high molecular weight polymers which tend to form in a stagnant layer on the walls of the reactor. In any event, it has been discovered that the gel inhibitors of this invention allow the polymerization process to be run continuously for a period of time in excess of thirty days without any plugging of the reactor. When the same reaction was conducted without employing the gel inhibitors of the invention, the reactor plugged severely after only 15 minutes of operation.

The gel inhibitors of this invention are employed in an amount sufficient to prevent the formation of gel during polymerization. In general, the 1,2-diolefin gel inhibitors are employed in an amount equal to at least about 0.1 mol per mol of catalyst with no practical upper limit except to stay below a concentration which would interfere with the polymerization reaction. When propadiene is employed as the gel inhibitor it is preferably used in an amount between about 0.16 and about 2 mols per mol of catalyst. When 1,2-butadiene is employed as the gel inhibitor it is preferred that it be used in an amount between about 0.5 and about 10 mols per mol of catalyst.

The organolithium catalyst is employed in an amount sufficient to effect polymerization of the monomers charged to the reactor. In general, the organolithium catalyst is present in the reactor in an amount between about 0.05 and about 2 parts by weight per 100 parts by weight of the total monomers charged to the reactor. This catalyst concentration is applicable to the polymerization of a single conjugated diolefin, mixtures of two or more conjugated diolefins, and mixtures of a conjugated diolefin with other polymerizable monomers.

When the polymer produced by the process of this invention is a copolymer of a conjugated diolefin and another polymerizable monomer the improvements realized with the gel inhibitors of the invention are more pronounced when the resulting polymer contains at least about 50 weight percent combined conjugated diolefin.

The following example illustrates a typical set of conditions which can be employed in the practice of the invention. It is to be understood that this example is for the purpose of illustration only and should not be construed as limiting of the invention.

EXAMPLE

A polymer of 1,3-butadiene was prepared in a reactor in the form of a jacketed, three-quarter inch inside diameter stainless steel tube approximately 80 feet long. Benzene containing 333 p.p.m. (0.1 part by weight per 100 parts 1,3-butadiene) butyllithium catalyst was charged to the reactor at a rate of 60 pounds per hour. The 1,3-butadiene monomers containing about 350 p.p.m. (0.56 mol per mol of catalyst) propadiene gel formation inhibitor was charged to the reactor at a rate of about 20 pounds per hour. The polymerization reaction was conducted at an average pressure of about 750 p.s.i. and at a jacket temperature of about 140° C. The reaction mixture containing polymer was continuously withdrawn from the reactor. The polymerization reaction was conducted in excess of 30 days with no plugging or impacting during this time.

While the invention has been described as being a continuous polymerization process, it is evident that the gel inhibitors can be employed to prevent the formation of gel even though the polymerization reaction is interrupted for short periods of time. Thus, as used herein the term "continuous" is intended to mean any polymerization process wherein the formation of gel would necessitate interrupting the process to correct the problem of gel formation.

The polymers of this invention have a variety of utilities in many different fields. The polymers are particularly suitable for fabrication into rubber articles of manufacture useful in the construction field, automotive field, communication field, and the like.

Although the invention has been described in considerable detail, it must be understood that such description is for the purpose of illustration only and should not be construed as limiting of the invention.

That which is claimed is:

1. In a continuous process for producing a polymer in a tube reactor of a size wherein the formation of gel can cause the reactor to become plugged, which polymer contains at least a major proportion of polymerized conjugated diolefin, which process includes the step of contacting conjugated diolefin monomers having from 4 to 10 carbon atoms per molecule with a catalyst comprising an organolithium compound having the formula $R(Li)_n$ wherein R is a hydrocarbon radical selected from the group consisting of aliphatic, cycloaliphatic, and aromatic radicals and $n$ is an integer from 1 to 4, inclusive, in a hydrocarbon diluent under polymerization conditions to produce said polymer, the improvement comprising carrying out said contacting in the presence of a gel inhibitor present in an amount between about 0.1 and about 10 mols per mol of catalyst to substantially prevent the formation of gel during polymerization, said gel inhibitor being selected from the group consisting of 1,2-diolefins having up to about 10 carbon atoms per molecule.

2. A process according to claim 1 wherein said gel inhibitor is propadiene present in an amount between about 0.16 and about 2 mols per mol of catalyst.

3. A process according to claim 1 wherein said gel inhibitor is 1,2-butadiene present in an amount between about 0.5 and about 10 mols per mol of catalyst.

4. A process according to claim 1 wherein said catalyst is present in an amount between about 0.05 and about 2 parts by weight per 100 parts by weight of total monomers charged.

5. A process according to claim 1 wherein said conjugated diolefin monomers are selected from the group consisting of 1,3-butadiene, isoprene, and piperylene.

6. A process according to claim 1 wherein said conjugated diolefin is 1,3-butadiene, said catalyst is butyllithium, said hydrocarbon diluent is benzene, and said gel inhibitor is propadiene present in an amount equal to about 0.56 mol per mol of butyllithium.

7. A process according to claim 1 wherein said contacting said conjugated diolefin monomers also includes contacting additional polymerizable monomers selected from the group consisting of styrene, t-butlystyrene, $\alpha$-methylstyrene, 3-methylstyrene, 1-vinylnaphthalene, vinylpyridines, vinyl halides, vinylidine halides, and esters of acrylic acid.

8. A process according to claim 7 wherein said additional polymerizable monomers are employed in an amount sufficient to result in said polymer having at least about 50 weight percent combined conjugated diolefin.

References Cited

UNITED STATES PATENTS

| | | | |
|---|---|---|---|
| 2,559,947 | 7/1951 | Crouch | 260—83.7 |
| 3,068,217 | 12/1962 | Higgins et al. | 260—94.3 |
| 3,284,430 | 11/1966 | Foreman et al. | 260—94.2 |
| 3,331,826 | 7/1967 | Talcott | 260—94.2 |

JOSEPH L. SCHOFER, Primary Examiner

W. F. HAMROCK, Assistant Examiner

U.S. Cl. X.R.

260—82.1, 83.7, 83.5